(12) United States Patent
Garrison et al.

(10) Patent No.: US 10,245,992 B2
(45) Date of Patent: Apr. 2, 2019

(54) LOADING RAMP ASSEMBLY AND A MOVABLE CARGO TRANSPORT INCLUDING THE LOADING RAMP ASSEMBLY

(71) Applicant: GM GLOBAL TECHNOLOGY OPERATIONS LLC, Detroit, MI (US)

(72) Inventors: Cheryl A. Garrison, Shelby Township, MI (US); Michael J. Briskey, Roseville, MI (US); Robert W. Glesner, Midland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 559 days.

(21) Appl. No.: 14/972,859

(22) Filed: Dec. 17, 2015

(65) Prior Publication Data

US 2017/0174113 A1 Jun. 22, 2017

(51) Int. Cl.
*B60P 1/43* (2006.01)

(52) U.S. Cl.
CPC .................... *B60P 1/433* (2013.01)

(58) Field of Classification Search
CPC .............. B60P 1/433; B60P 1/435
See application file for complete search history.

(56) References Cited

U.S. PATENT DOCUMENTS

| | | | | |
|---|---|---|---|---|
| 3,288,522 A * | 11/1966 | Norton | ....................... | B60P 1/43 105/458 |
| 3,319,811 A * | 5/1967 | Martin, Jr. | .............. | B60P 1/435 414/537 |
| 4,966,516 A * | 10/1990 | Vartanian | ................ | A61G 3/061 14/71.1 |
| 5,536,058 A * | 7/1996 | Otis | ........................ | B60P 1/435 296/61 |
| 5,538,307 A * | 7/1996 | Otis | ........................ | B60P 1/435 296/61 |
| 5,553,762 A * | 9/1996 | Brown | .................... | B60P 1/435 224/310 |
| 6,644,708 B1 * | 11/2003 | Grzegorzewski | ......... | B60P 1/43 296/10 |
| 7,344,184 B2 * | 3/2008 | Salvador | ................. | B60P 1/435 296/183.1 |
| 7,445,268 B2 * | 11/2008 | Faulkiner | ................ | B60P 1/431 296/183.1 |
| 8,052,019 B2 * | 11/2011 | Plavetich | .................. | B60P 3/06 224/403 |

(Continued)

*Primary Examiner* — Saul Rodriguez
*Assistant Examiner* — Ashley K Romano
(74) *Attorney, Agent, or Firm* — Quinn IP Law

(57) ABSTRACT

A loading ramp assembly is configured for attachment in a cargo area, and a movable cargo transport includes the cargo area. The cargo area includes a floor, a first sidewall disposed transverse to the floor and a second sidewall disposed transverse to the floor. The first and second sidewalls are spaced apart and generally align with each other. The loading ramp assembly includes a ramp pivotable inside the cargo area relative to the floor between a use position in which at least a portion of the ramp is disposed in a generally horizontal orientation on top of the floor and a storage position in which the ramp is spaced from the floor and secured in a generally vertical orientation along at least one of the first and second sidewalls.

20 Claims, 3 Drawing Sheets

(56) References Cited

U.S. PATENT DOCUMENTS

| | | | | |
|---|---|---|---|---|
| 8,347,440 | B1* | 1/2013 | Runyan | B60P 1/435 |
| | | | | 14/71.1 |
| 8,857,880 | B2* | 10/2014 | Kalergis | B60P 1/43 |
| | | | | 224/403 |
| 9,340,139 | B1* | 5/2016 | Morrell | B60P 1/435 |
| 9,475,529 | B2* | 10/2016 | Leisner | B62D 63/064 |
| 9,511,803 | B2* | 12/2016 | Wassell | B62D 33/03 |
| 9,878,675 | B2* | 1/2018 | George | B60R 9/02 |
| 2003/0222431 | A1* | 12/2003 | Crosby | B60P 3/122 |
| | | | | 280/656 |
| 2012/0139281 | A1* | 6/2012 | Cousino | B60P 1/435 |
| | | | | 296/61 |
| 2013/0134733 | A1* | 5/2013 | Peters | B62D 33/04 |
| | | | | 296/37.6 |
| 2014/0064896 | A1* | 3/2014 | Parmar | B60P 1/435 |
| | | | | 414/537 |
| 2015/0375686 | A1* | 12/2015 | George | B60R 9/02 |
| | | | | 248/201 |

* cited by examiner

LOADING RAMP ASSEMBLY AND A MOVABLE CARGO TRANSPORT INCLUDING THE LOADING RAMP ASSEMBLY

TECHNICAL FIELD

The present disclosure relates to a loading ramp assembly and a movable cargo transport including the loading ramp assembly.

BACKGROUND

Vehicles, such as pickup trucks and box trucks, generally include a cargo area that can be used to transport various sized cargo, including oversized cargo, between locations. The cargo area is typically defined by a cargo floor, two sidewalls, a back wall proximal to a passenger compartment of the vehicle and a tailgate or a door spaced from the back wall. The tailgate or door provides an opening to facilitate loading and unloading of cargo onto the cargo floor.

A ramp can be utilized to assist in loading and unloading the cargo from the cargo area. Some ramps are completely separate from the vehicle and are maneuvered by a user to the desired location relative to the tailgate to allow loading/unloading of the cargo. Furthermore, if the ramp is not retractable, the ramp travels in the cargo area but depending on the length of the ramp, the ramp could extend outside of the cargo area.

Some vehicles have a slot under the cargo floor that can store a ramp when traveling between locations. This type of ramp is completely removable from the slot and the user maneuvers the ramp to the desired location relative to the tailgate to allow loading/unloading of the cargo.

SUMMARY

The present disclosure provides a loading ramp assembly configured for attachment in a cargo area. The cargo area includes a floor, a first sidewall disposed transverse to the floor and a second sidewall disposed transverse to the floor. The first and second sidewalls are spaced apart and generally align with each other. The loading ramp assembly includes a ramp pivotable inside the cargo area relative to the floor between a use position in which at least a portion of the ramp is disposed in a generally horizontal orientation on top of the floor and a storage position in which the ramp is spaced from the floor and secured in a generally vertical orientation along at least one of the first and second sidewalls.

The present disclosure also provides a movable cargo transport including a cargo area. The cargo area includes a floor, a first sidewall disposed transverse to the floor and a second sidewall disposed transverse to the floor. The first and second sidewalls are spaced apart and generally align with each other. The transport also includes a ramp. The ramp includes a first ramp body and a second ramp body that are pivotable inside the cargo area between a use position and a storage position. The first ramp body is pivotable to the use position in which at least a portion of the first ramp body is disposed in a generally horizontal orientation on top of the floor and the storage position in which the first ramp body is secured in a generally vertical orientation along the first sidewall such that the first ramp body is completely disposed inside the cargo area. The second ramp body is pivotable to the use position in which at least a portion of the second ramp body is disposed in a generally horizontal orientation on top of the floor and the storage position in which the second ramp body is secured in a generally vertical orientation along the second sidewall such that the second ramp body is completely disposed inside the cargo area.

The detailed description and the drawings or Figures are supportive and descriptive of the disclosure, but the claim scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Those having ordinary skill in the art will recognize that all directional references (e.g., above, below, upward, up, downward, down, bottom, left, right, etc.) are used descriptively for the figures to aid the reader's understanding, and do not represent limitations (for example, to the position, orientation, or use, etc.) on the scope of the disclosure, as defined by the appended claims. Furthermore, the term "substantially" can refer to a slight imprecision or slight variance of a condition, quantity, value, or dimension, etc., some of which that are within manufacturing variance or tolerance ranges. In addition, the phrase "at least one of" as used herein should be construed to include the non-exclusive logical "or", i.e., A and/or B and so on depending on the number of components.

Figure 1:
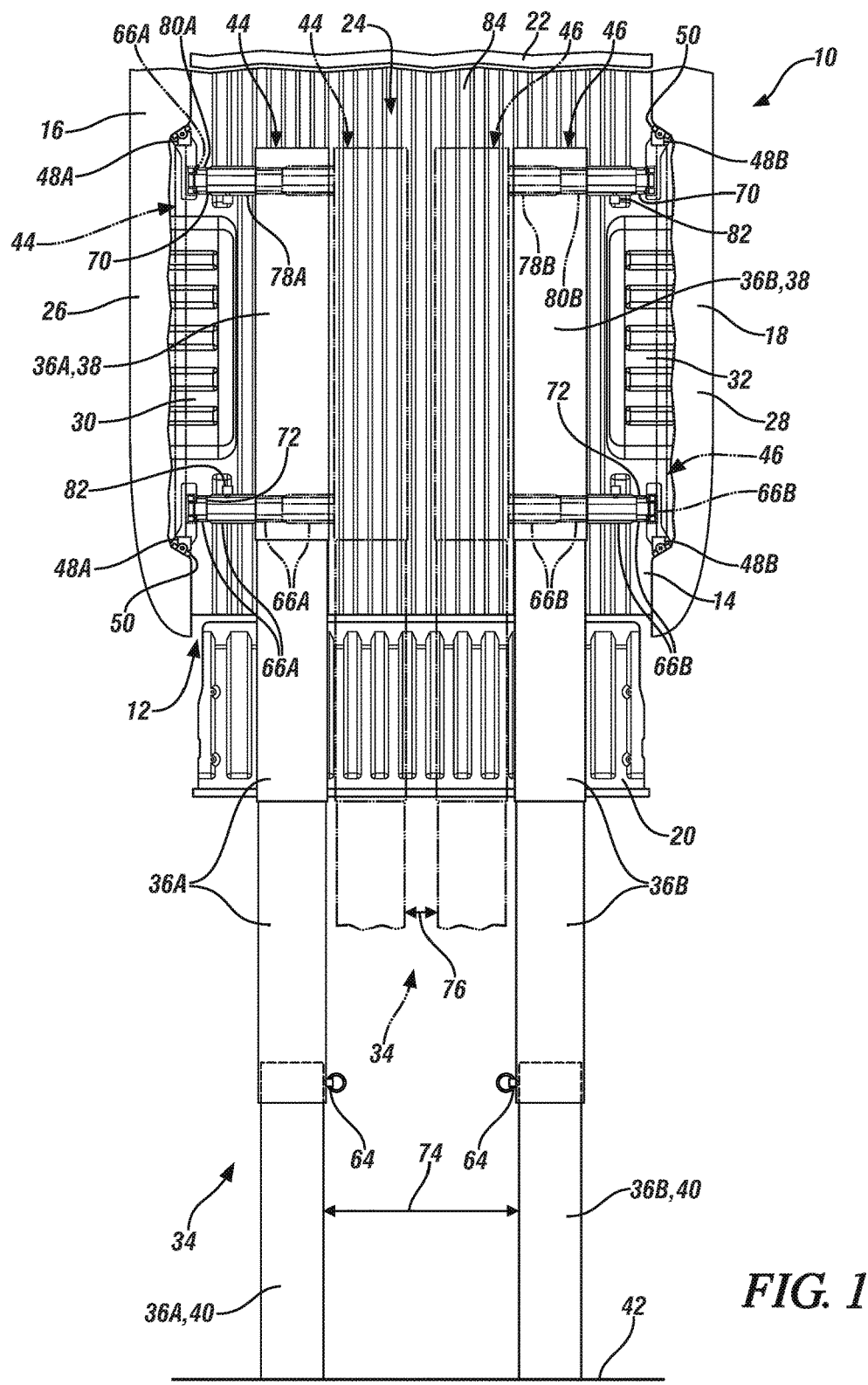
FIG. 1 is a schematic top view of a loading ramp assembly, with a ramp illustrated in solid lines in a use position, a portion of a first sidewall and a second sidewall are fragmented to illustrate the ramp in phantom lines in a storage position, and the ramp is illustrated in phantom lines in the use position which is adjusted relative to first and second sidewalls to a different position from the ramp in the solid lines.

Referring to the Figures, wherein like numerals indicate like or corresponding parts throughout the several views, a loading ramp assembly 10 is generally shown in FIG. 1. As discussed in detail below, the loading ramp assembly 10 provides a convenient way to load and unload cargo. Therefore, the loading ramp assembly 10 can be incorporated into a movable cargo transport. As such, the moveable cargo transport can include the loading ramp assembly 10.

The loading ramp assembly 10 can be utilized in a vehicle application or a non-vehicle application. Non-limiting examples of a vehicle can be the movable cargo transport, a movable platform, a truck, a box truck, a commercial vehicle, an industrial vehicle, a passenger vehicle, an aircraft, a watercraft, a locomotive, farm equipment, a construction vehicle, a warehouse vehicle, etc. The vehicle can include a passenger compartment. Non-vehicle applications can include farm equipment, manufacturing facilities, warehouses, etc.

As shown in FIG. 1, the movable cargo transport can include a cargo area 12. The loading ramp assembly 10 is configured for attachment in the cargo area 12. The cargo area 12 can be utilized to transport different sized cargo, including oversized cargo.

The cargo area 12 includes one or more of a floor 14, a first sidewall 16 disposed transverse to the floor 14 and a second sidewall 18 disposed transverse to the floor 14. The first and second sidewalls 16, 18 are spaced apart and generally align with each other (see FIG. 1). The cargo area 12 can also include a tailgate 20 or door and a front wall 22 spaced apart from the tailgate 20 and generally aligning with the tailgate 20 (again, see FIG. 1). The cargo area 12 defines a cargo space 24 at least partially defined by one or more of the floor 14, the first and second sidewalls 16, 18, the tailgate 20 and the front wall 22. The front wall 22 can be part of the cargo area 12 that is a component spaced from the passenger compartment or the front wall 22 can be part of a component that defines the passenger compartment. The cargo space 24 can be exposed to an outside environment or be covered to reduce exposure of the cargo space 24 to the outside environment.

Continuing with FIG. 1, the first sidewall 16 can extend away from the floor 14 to a distal edge 26 spaced from the floor 14. Similarly, the second sidewall 18 can extend away from the floor 14 to a distal edge 28 spaced from the floor 14. In certain embodiments, the distal edges 26, 28 of the first and second sidewalls 16, 18 are exposed to the outside environment. Optionally, the distal edges 26, 28 of the first and second sidewalls 16, 18 can have a cap disposed thereon to enclose the cargo area 12 and reduce exposure of the cargo space 24 to the outside environment.

The tailgate 20 is movable between an open position and a closed position. The tailgate 20 is shown in the open position in FIG. 1 for illustrative purposes. The tailgate 20 is generally planar or substantially parallel with the floor 14 when in the open position to allow easy access to the cargo space 24. The tailgate 20 is latched to one or both of the first and second sidewalls 16, 18 when in the closed position such that the floor 14 of the cargo space 24 is surrounded by the first and second sidewalls 16, 18, the front wall 22 and the tailgate 20. Therefore, when the tailgate 20 is in the closed position, the tailgate 20 assists in containing any cargo inside the cargo area 12. If utilizing the door, the door can roll up relative to the sidewalls 16, 18 to expose the floor 14 when in the open position, and the door can roll down relative to the sidewalls 16, 18 when in the closed position.

In a vehicle application, the floor 14 and one of the first and second sidewalls 16, 18 cooperate to present a protrusion 30 (see FIG. 1) disposed inside the cargo area 12 or the cargo space 24 which defines a backside of a wheel well. Generally, the wheel well creates a space for a wheel of the vehicle. In certain embodiments, the protrusion 30 can be further defined as a first protrusion 30 and the wheel well can be further defined as a first wheel well. Therefore, the floor 14 and the first sidewall 16 can cooperate to present the first protrusion 30 disposed inside the cargo area 12 which defines the backside of the first wheel well.

For a vehicle that has two wheels under the cargo area 12, which is also illustrated in FIG. 1, the floor 14 and the second sidewall 18 can cooperate to present a second protrusion 32 disposed inside the cargo area 12 or the cargo space 24 which defines a backside of a second wheel well. The second wheel well creates a space for another wheel of the vehicle. The first and second wheel wells are spaced apart and generally aligning with each other (see FIG. 1).

Again, continuing with FIG. 1, the loading ramp assembly 10 also includes a ramp 34 pivotable inside the cargo area 12 relative to the floor 14. Therefore, generally, the ramp 34 is rotatable inside the cargo space 24 relative to the floor 14. In certain embodiments, the ramp 34 is pivotable/rotatable relative to the floor 14, the first sidewall 16 and the second sidewall 18 inside the cargo area 12. The ramp 34 can be utilized to load various cargo into the cargo area 12 and unload that cargo from the cargo area 12. Non-limiting examples of various cargo that can utilize the loading ramp assembly 10 is an all-terrain vehicle (ATV), an off-road vehicle (ORV), a lawn mower, a snowmobile, a power washer, a generator, a motorcycle, a bicycle, etc.

The ramp 34 is integrated into the cargo space 24 so the ramp 34 does not have to be completely removed from the cargo area 12 in order to use the ramp 34. Furthermore, the ramp 34 described herein does not have to be carried in order to use the ramp 34. The ramp 34 provides quick and easy loading and unloading of cargo.

The ramp 34 is pivotable between a use position in which at least a portion of the ramp 34 is disposed in a generally horizontal orientation on top of the floor 14 and a storage position in which the ramp 34 is spaced from the floor 14 and secured in a generally vertical orientation along at least one of the first and second sidewalls 16, 18. Simply stated, the ramp 34 is rotatable between the use position in which the ramp 34 is disposed on top of the floor 14 and the storage position in which the ramp 34 is spaced from the floor 14 and secured relative to at least one of the first and second sidewalls 16, 18. As such, when the ramp 34 is in the storage position, the ramp 34 is disposed along one or more of the first and second sidewalls 16, 18 and secured in place relative to one or more of the sidewalls 16, 18 to minimize movement of the ramp 34 in the cargo space 24 during travel or non-use; and when it is desirable to use the ramp 34, the ramp 34 folds down away from the first and second sidewalls 16, 18 to the floor 14 when in the use position without having to remove the entire ramp 34 from the cargo area 12. Therefore, the ramp 34 can be secured relative to the first sidewall 16 and/or the second sidewall 18.

Figure 2:
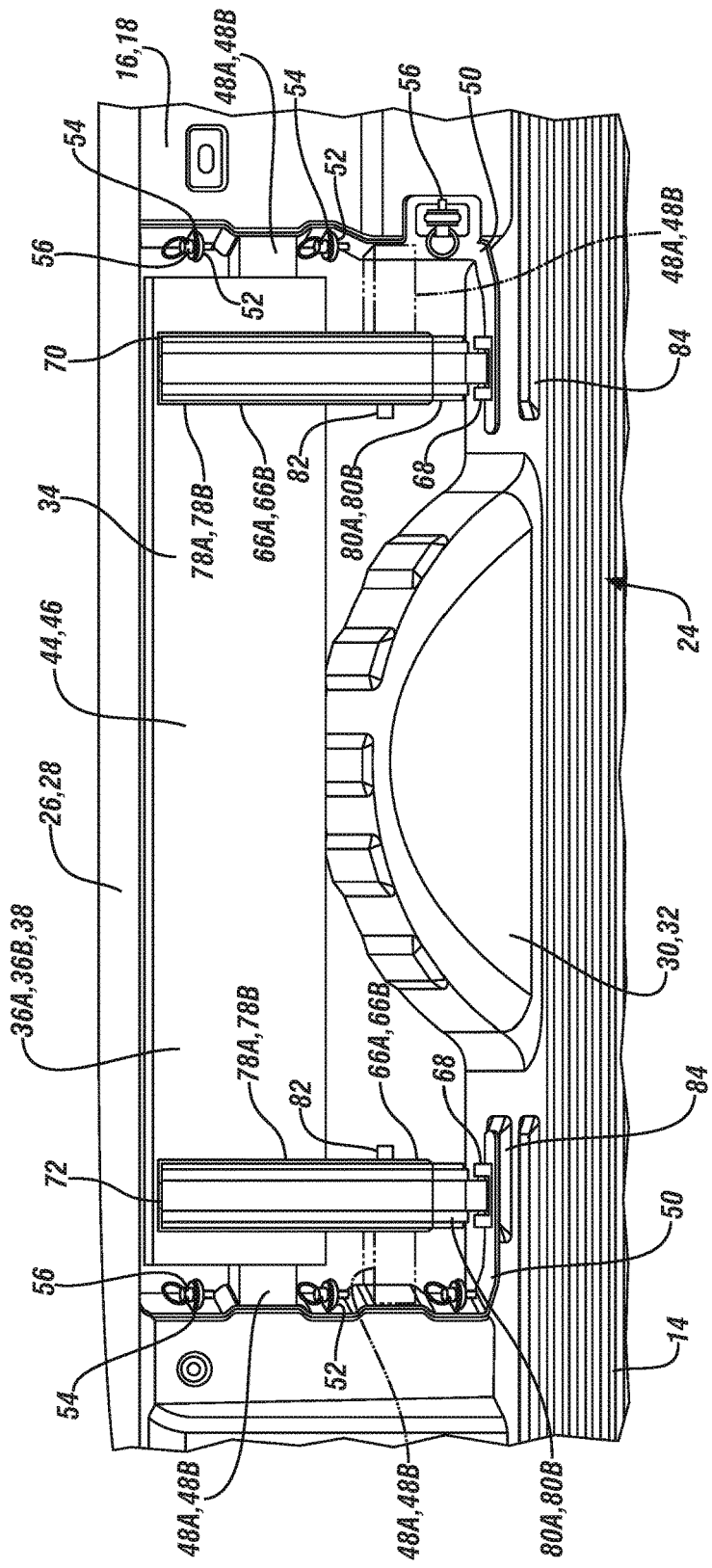
FIG. 2 is a schematic fragmentary side view of the ramp in a storage position.

Generally, when the ramp 34 is in the use position, the ramp 34 is disposed between the first and second wheel wells along the floor 14 of the cargo area 12. Simply stated, when the ramp 34 is in the use position, at least a portion of the ramp 34 abuts or engages the floor 14, and when the ramp 34 is in the storage position, the ramp 34 does not abut or engage the floor 14. FIG. 1 illustrates the ramp 34 in the use position in solid lines and phantom lines (in phantom lines the ramp 34 is adjusted to another position relative to the first and second sidewalls 16, 18, which is discussed in detail below). FIG. 1 also illustrates the ramp 34 in the storage position in phantom lines, and FIG. 2 illustrates the ramp 34 in the storage position.

It is desirable to be able to extend the ramp 34 beyond the cargo area 12 to load and unload the cargo, and also be able to retract the ramp 34 to minimize the space that the ramp 34 occupies when not in use. Therefore, as best shown in FIG. 1, the ramp 34 can include a plurality of segments 36 that cooperate with each other, and which can extend beyond the cargo area 12 and can also retract to be contained completely in the cargo area 12.

Generally, at least one of the segments 36 is movable between a loading position and a stowed position. The loading position allows the cargo to be loaded into the cargo area 12 and unloaded from the cargo area 12. Therefore, the loading position is utilized when the ramp 34 is in the use position. The stowed position allows the ramp 34 to be stored in the cargo area 12 when not in use. The loading position of the segments 36 are shown in FIG. 1 in solid lines, and also partially shown in phantom lines in FIG. 1 with the ramp 34 being in the use position. The stowed position of the segments 36 are also shown in FIG. 1 in the phantom lines adjacent to the respective first and second sidewalls 16, 18. The stowed position of the segments 36 are also shown in FIG. 2.

At least one of the segments 36 is configured to telescope outwardly relative to another one of the segments 36 such that at least a portion of the ramp 34 is disposed outside of the cargo area 12 when in the loading position. Furthermore, at least one of the segments 36 is configured to retract inwardly relative to the another one of the segments 36 such that the ramp 34 is completely contained inside the cargo area 12 when in the stowed position. Therefore, the segments 36 can be at least partially nested inside each other. The segments 36 remain coupled to each other, i.e., do not completely separate from each other, when in both the loading and stowed positions, which provides a quick and easy way to deploy and retract the ramp 34.

For illustrative purposes only, FIG. 1 illustrates three segments 36 that are movable relative to each other and relative to an initial segment 38. The initial segment 38 remains stationary as the other segments 36 move between the loading and stowed position. The movable segments 36 can slide, roll, etc. relative to other movable segments 36 and relative to the stationary segment 38. It is to be appreciated that any suitable number of segments 36 can be utilized, and therefore, more or less movable segments 36 than illustrated can be suitable. Furthermore, an end segment 40, which is one of the movable segments 36, can engage a surface 42, such as the ground, outside of the cargo area 12 when in the loading position, which provides a smooth transition between the ground and the ramp 34.

Continuing with FIG. 1, in certain embodiments, the ramp 34 can include a first ramp body 44 and a second ramp body 46. The first and second ramp bodies 44, 46 are each pivotable or rotatable inside the cargo area 12 between the use and storage positions. The first ramp body 44 is pivotable to the use position in which at least a portion of the first ramp body 44 is disposed in a generally horizontal orientation on top of the floor 14 and the storage position in which the first ramp body 44 is secured in a generally vertical orientation along the first sidewall 16. Simply stated, the first ramp body 44 is rotatable to the use position in which the first ramp body 44 is disposed on top of the floor 14 and the storage position in which the first ramp body 44 is secured relative to the first sidewall 16.

The second ramp body 46 is pivotable to the use position in which at least a portion of the second ramp body 46 is disposed in a generally horizontal orientation on top of the floor 14 and the storage position in which the second ramp body 46 is secured in a generally vertical orientation along the second sidewall 18. Simply stated, the second ramp body 46 is rotatable to the use position in which the second ramp body 46 is disposed on top of the floor 14 and the storage position in which the second ramp body 46 is secured relative to the second sidewall 18.

In certain embodiments, the first and second ramp bodies 44, 46 are pivotable or rotatable between the use and storage positions in opposite directions from each other. Furthermore, the first and second ramp bodies 44, 46 can be pivoted/rotated between the use and storage positions independently of each other. Therefore, the first and second ramp bodies 44, 46 can be pivoted or rotated one at a time. Furthermore, if loading/unloading a motorcycle or bicycle, then one of the ramp bodies 44, 46 can be utilized instead of both. The first and second ramp bodies 44, 46, and the features/components around these bodies 44, 46, of FIG. 1 are a mirror image of each other, and therefore, FIG. 2 can represent the features/components of both of the first and second ramp bodies 44, 46 and accompanying features/components.

Generally, the first ramp body 44 can be secured relative to the first sidewall 16 when in the storage position and the second ramp body 46 can be secured relative to the second sidewall 18 when in the storage position. The first ramp body 44 is disposed between the distal edge 26 of the first sidewall 16 and the first protrusion 30 when in the storage position. Furthermore, the second ramp body 46 is disposed between the distal edge 28 of the second sidewall 18 and the second protrusion 32 when in the storage position.

The loading ramp assembly 10 can also include a latching device 48 (see FIGS. 1 and 2) supported by at least one of the first and second sidewalls 16, 18 and configured to secure the ramp 34 in the storage position and release the ramp 34 to allow rotation of the ramp 34 to the use position. Generally, the latching device 48 can engage the ramp 34 or can engage a part that extends from the ramp 34 to secure the ramp 34 in the storage position. Therefore, the latching device 48 can be supported by the first sidewall 16 and/or the second sidewall 18. It is to be appreciated that the latching device 48 can be any suitable location and the Figures are for illustrative purposes only. For example, in certain embodiments, the latching device 48 can be supported by the floor 14.

In certain embodiments, the latching device 48 can include a first latching device 48A which cooperates with the first ramp body 44 and a second latching device 48B which cooperates with the second ramp body 46. The first latching device 48A can be supported by the first sidewall 16 and is configured to secure the first ramp body 44 in the storage position and release the first ramp body 44 relative to the first sidewall 16 which allows rotation of the first ramp body 44 to the use position. Similarly, the second latching device 48B can be supported by the second sidewall 18 and is configured to secure the second ramp body 46 in the storage position and release the second ramp body 46 relative to the second sidewall 18 which allows rotation of the second ramp body 46 to the use position.

The first and second latching devices 48A, 48B can be directly secured to the respective first and second sidewalls 16, 18, or alternatively, can be indirectly secured to the respective first and second sidewalls 16, 18 by one or more mounting brackets 50. For illustrative purposes only, FIG. 1 illustrates two mounting brackets 50 that cooperate with the first sidewall 16 and another two mounting brackets 50 that cooperate with the second sidewall 18. If utilizing the mounting brackets 50, the mounting brackets 50 can be secured to the respective first and second sidewalls 16, 18 by one or more eyelets 52 (see FIG. 2) or tie down members which extend from the respective first and second sidewalls 16, 18. The mounting brackets 50 can have one or more openings 54 (see FIG. 2) in which the respective eyelet 52 extends therethrough. Respective connecting members 56 (again, see FIG. 2) are disposed through respective eyelets 52 to secure the mounting brackets 50 to the respective first and second sidewalls 16, 18. The mounting brackets 50 can be an add-on or aftermarket product which is configured to cooperate with various cargo area 12 designs such that no drilling, etc. of the floor 14 or the sidewalls 16, 18 is required to install the ramp 34 in the cargo area 12. Alternatively, the mounting brackets 50 can be secured to the floor 14 and/or respective sidewalls 16, 18 by one or more fasteners and any suitable method which can include drilling. Furthermore, if not utilizing the mounting brackets 50, the first and second latching devices 48A, 48B can be directly secured to respective sidewalls 16, 18 by one or more fasteners and any suitable method which can include drilling.

In certain embodiments, the first latching device 48A can include a plurality of first latching devices 48A, with one of the first latching devices 48A securing one end of the first ramp body 44 in the storage position and another one of the first latching devices 48A securing another end of the first ramp body 44 in the storage position. Furthermore, in certain embodiments, the second latching device 48B can include a plurality of second latching devices 48B, with one of the second latching devices 48B securing one end of the second ramp body 46 in the storage position and another one of the second latching devices 48B securing another end of the second ramp body 46 in the storage position. The latching devices 48A, 48B are shown schematically in FIGS. 1 and 2 because the latching devices 48A, 48B can be any suitable configuration. Non-limiting examples of the latching device(s) 48A, 48B can include one or more of a fastener, a clip, a spring clip, a clamp, a tab, a latch, a spring latch, a snap, a coupler, a pin, a spring pin, etc., and any combination thereof.

Turning back to the configuration of the ramp 34, the first ramp body 44 and the second ramp body 46 can include the segments 36 discussed above. For example, the first ramp body 44 can include a plurality of first segments 36A cooperating with each other, and the second ramp body 46 can include a plurality of second segments 36B cooperating with each other. At least one of the first segments 36A of the first ramp body 44 is movable between the loading position and the stowed position, and similarly, at least one of the second segments 36B is movable between the loading position and the stowed position, as generally discussed above.

Once the tailgate 20 is in the open position and it is desirable to use both of the first and second ramp bodies 44, 46, the first and second ramp bodies 44, 46 can be moved from the storage position to the use position by the latching devices 48A, 48B releasing the first and second ramp bodies 44, 46. Once the first and second ramp bodies 44, 46 are disposed on the floor 14, then the first and second segments 36A, 36B can be moved from the stowed position to the loading position in which at least a portion of the first and second ramp bodies 44, 46 are disposed outside of the cargo area 12. When the cargo is loaded or unloaded, then the first and second segments 36A, 36B can be moved from the loading position to the stowed position. Then, if desired, the first and second ramp bodies 44, 46 can be moved from the use position to the storage position in which the latching devices 48A, 48B secure the respective first and second ramp bodies 44, 46 in the storage position relative to the respective first and second sidewalls 16, 18.

When the first and second ramp bodies 44, 46 are in the storage position, the first and second ramp bodies 44, 46 are completely disposed inside the cargo area 12. Furthermore, when the first and second segments 36A, 36B are disposed in the stowed position, the first and second ramp bodies 44, 46 are also completely disposed inside the cargo area 12. Simply stated, the tailgate 20 can be in the closed position when the ramp 34 is in the use and storage positions. However, when the segments 36 of the ramp 34 are extended to the loading position, the tailgate 20 is in the open position and the ramp 34 is not completely disposed inside the cargo area 12.

If the cargo cannot be maneuvered off the ramp 34 once loaded in the cargo area 12, the ramp 34 can remain in the use position, i.e., be disposed on top of the floor 14, and the segments 36 can be moved into the stowed position such that the tailgate 20 can be moved to the closed position if the cargo is sized to allow the tailgate 20 to close. Even if the cargo is not too large to allow the ramp 34 to move back to the storage position, the ramp 34 can remain in the use position, and once the segments 36 are in the stowed position, the tailgate 20 can be closed.

At least one of the first segments 36A is configured to telescope outwardly relative to another one of the first segments 36A such that at least a portion of the first ramp body 44 is disposed outside of the cargo area 12 when in the loading position (see FIG. 1). Therefore, at least the portion of the first ramp body 44 can be one or more of the first segments 36A disposed outside of the cargo area 12. Furthermore, at least one of the first segments 36A is configured to retract inwardly relative to the another one of the first segments 36A such that the first ramp body 44 is completely contained inside the cargo area 12 when in the stowed position (see FIG. 2, which can represent either of the ramp bodies 44, 46 as discussed above due to the ramp bodies 44, 46 being mirror images). Therefore, the first segments 36A can be at least partially nested inside each other when in the stowed position. Optionally, one or more of the first segments 36A can remain in the stowed position by a friction fit.

At least one of the second segments 36B is configured to telescope outwardly relative to another one of the second segments 36 such that at least a portion of the second ramp body 46 is disposed outside of the cargo area 12 when in the loading position (see FIG. 1). Therefore, at least the portion of the second ramp body 46 can be one or more of the second segments 36B disposed outside of the cargo area 12. Furthermore, at least one of the second segments 36B is configured to retract inwardly relative to the another one of the second segments 36B such that the second ramp body 46 is completely contained inside the cargo area 12 when in the stowed position (see FIG. 2, which can represent either of the ramp bodies 44, 46). Therefore, the second segments 36B can be at least partially nested inside each other when in the stowed position. Optionally, one or more of the second segments 36B can remain in the stowed position by a friction fit.

Figure 3:
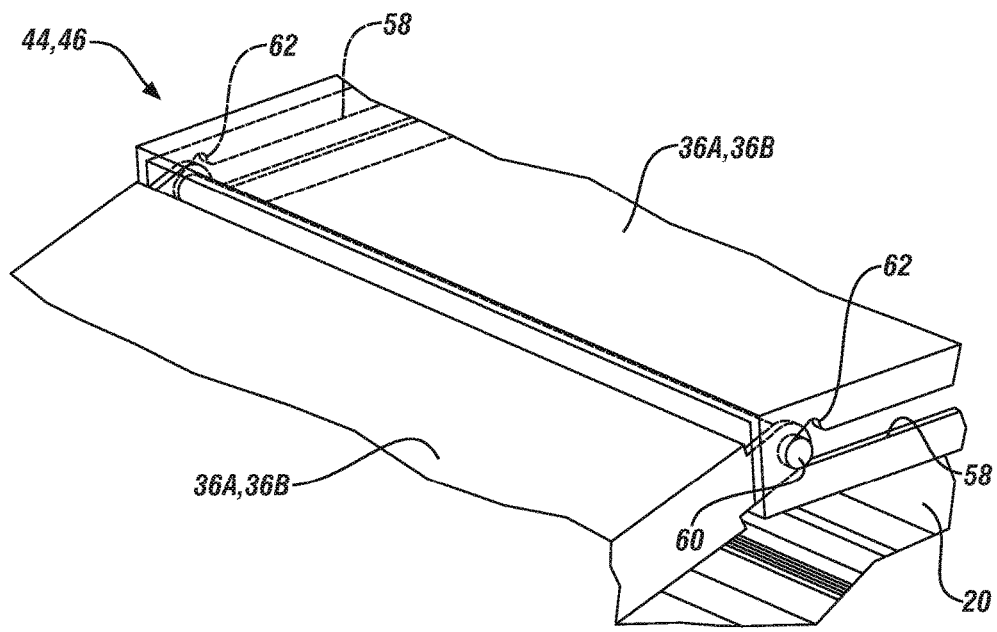
FIG. 3 is a schematic fragmentary perspective view of the ramp including a stop feature.

Referring to FIG. 3, optionally, one or more of the first and second segments 36A, 36B can define one or more slots 58, and one or more of the first and second segments 36A, 36B can include one or more projections 60 disposed in the respective slot(s) 58 to guide movement of the respective first and second segments 36A, 36B relative to each other between the loading and stowed positions. Furthermore, the slots 58 and the projections 60 allow the respective segments 36A, 36B to rotate relative to each other which allows the segments 36A, 36B to be angled toward the ground (see FIG. 3). FIG. 3 can represent either of the ramp bodies 44, 46, and specifically the segments 36A, 36B of the ramp bodies 44, 46.

For example, as shown in FIG. 3, one of the segments 36 defines slots 58 and another one of the segments 36 includes projections 60. It is to be appreciated that one or more of the segments 36 can include both slots 58 and projections 60, and one or more of the segments 36 can include slots 58 or projections 60, but not both. The slot(s) 58 of the first and/or second segments 36A, 36B can be visible from outside of the first and second segments 36A, 36B or can be hidden inside the respective first and second segments 36A, 36B such that the slot(s) 58 are not visible from outside of the first and second segments 36A, 36B. Depending on the location of the slot(s) 58, the projection(s) 60 can be visible from outside of the first and second segments 36A, 36B or can be hidden inside the respective first and second segments 36A, 36B such that the projection(s) 60 are not visible from outside of the first and second segments 36A, 36B. For the first and/or second segments 36A, 36B with the slots 58, the slots 58 of the first segment 36A can align and be spaced apart from each other. Similarly, for the first and/or second segments 36A, 36B with the projections 60, the projections 60 can align and be spaced apart from each other or alternatively, one elongated projection 60 can extend between the corresponding slots 58, and thus, be disposed in the corresponding slot 58.

Continuing with FIG. 3, at least one of the segments 36 includes a stop feature 62 configured to prevent at least one of the segments 36 from retracting to the stowed position when the segments 36 are in the loading position. Specifically, at least one of the first segments 36A can include the stop feature 62 which is configured to prevent at least one of the first segments 36A from retracting to the stowed position when the first segments 36 are in the loading position, and at least one of the second segments 36B can include the stop feature 62 configured to prevent at least one of the second segments 36B from retracting to the stowed position when the second segments 36B are in the loading position. Therefore, for example, when cargo is on the ramp 34, the stop feature 62 prevents the segment(s) 36 from retracting to the stowed position. The stop feature 62 can be a recess that extends outwardly from the respective slots 58, and respective projection(s) 60 move into the respective recess when the corresponding segment 36 begins to move back toward the stowed position when loading or unloading cargo, which stops further movement of that segment 36 toward the stowed position. It is to be appreciated that the stop feature 62 can be any suitable configuration, and can be other configurations than the recess.

Figure 4:
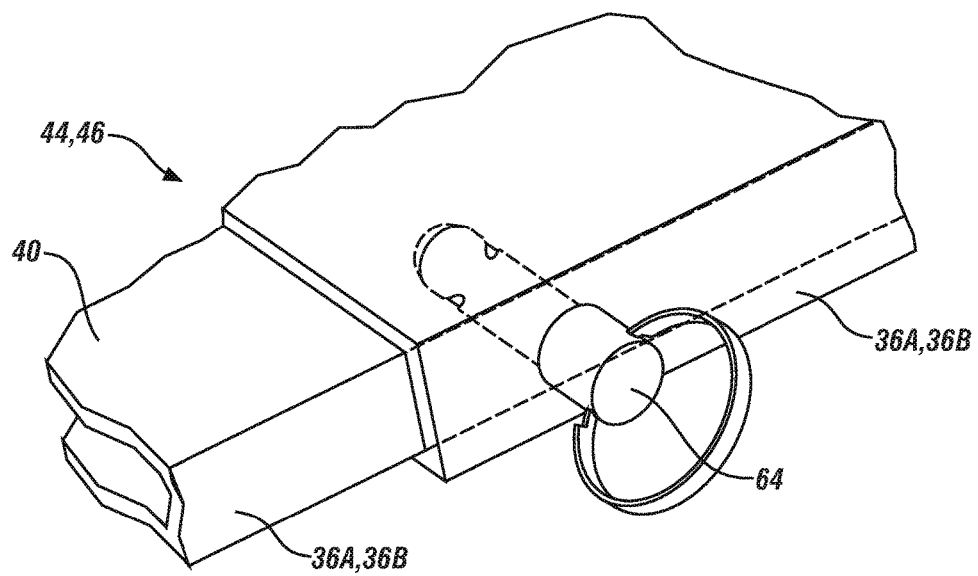
FIG. 4 is a schematic fragmentary perspective view of the ramp including a locking feature.

Referring to FIGS. 1 and 4, the end segment 40 of the first and second segments 36A, 36B can be secured in the loading position by a first locking feature 64, which prevents the respective end segments 40 from retracting toward the stowed position when cargo is on the ramp 34 in the loading position. A portion of the end segment 40 of each of the first and second segments 36A, 36B remains inside a portion of the adjacent segment 36 of the respective first and second segments 36A, 36B which assists in supporting the load of the cargo when on the ramp 34. The first locking feature 64 is disposed through both adjacent segments 36 of respective first and second ramp bodies 44, 46 to prevent movement of those segments 36 relative to each other. FIG. 4 can represent either of the ramp bodies 44, 46, and specifically the first locking feature 64 that cooperates with either of the segments 36A, 36B.

The first locking feature 64 can be any suitable configuration, and one non-limiting example is that the adjacent segments 36 of respective first and second ramp bodies 44, 46 can define respective holes that align with each other when telescoped to the proper position and a pin is disposed through the aligned holes to maintain the position of those segments 36 relative to each other. The first locking feature 64 can be other configurations, and non-limiting examples can include one or more of a pin, a clip, a turn knob, a spring pin, a spring clip, a latch, a spring latch, a stop lock, a wedge, a fastener, etc., or combinations thereof.

Turning to a component that supports the ramp 34, the loading ramp assembly 10 can include a bracket 66 attached to the ramp 34 (see FIGS. 1 and 2). The bracket 66 can extend outwardly away from the ramp 34 to space the ramp 34 away from the floor 14 when in the storage position. The bracket 66 can be directly secured to at least one of the floor 14 and the first and second sidewalls 16, 18, or alternatively, can be indirectly secured to at least one of the floor 14 and the first and second sidewalls 16, 18 by one or more of the mounting brackets 50. Therefore, the bracket 66 can be secured, directly or indirectly, to the floor 14 and/or secured, directly or indirectly, to the first sidewall 16. Also, the bracket 66 can be secured, directly or indirectly, to the floor 14 and/or secured, directly or indirectly, to the second sidewall 18. Therefore, the bracket 66 can be indirectly secured to the floor 14 and/or respective sidewalls 16, 18 by one or more of the mounting brackets 50 such that the ramp 34 can be an add-on or aftermarket product that can be incorporated with various cargo area 12 designs such that no drilling, etc. of the floor 14 or the sidewalls 16, 18 is required to install the ramp 34 in the cargo area 12. Alternatively, the bracket 66 can be directly secured to the floor 14 and/or respective sidewalls 16, 18 by one or more fasteners and any suitable method which can include drilling. Furthermore, if not utilizing the mounting brackets 50, the bracket 66 can be directly secured to the floor 14 and/or respective sidewalls 16, 18 by one or more fasteners and any suitable method which can include drilling.

Furthermore, the bracket 66 can include a pivot point 68 (best shown in FIG. 2) such that the bracket 66 and the ramp 34 are pivotable or rotatable in unison about the pivot point 68 between the use and storage positions. When utilizing the mounting brackets 50, the pivot point 68 can be incorporated into the mounting brackets 50. By incorporating the pivot point 68 with the mounting brackets 50, the ramp 34 can be an add-on or aftermarket product that can be incorporated with various cargo area 12 designs such that no drilling, etc. of the floor 14 or the sidewalls 16, 18 is required to install the ramp 34 in the cargo area 12. The pivot point 68 can include a hinge or be any other suitable configuration to allow the bracket 66 to pivot/rotate the ramp 34 between the use and storage positions. The bracket 66 is configured to position the ramp 34 away from the protrusion 30 such that the ramp 34 is pivotable or rotatable between the use and storage positions without interference from the protrusion 30.

The bracket 66 can include a first bracket 66A attached to the first ramp body 44 and a second bracket 66B attached to the second ramp body 46. Each of the first and second brackets 66A, 66B are pivotable or rotatable about respective pivot points 68. The first bracket 66A can extend outwardly away from the first ramp body 44 to space the first ramp body 44 away from the floor 14 when in the storage position. Furthermore, the first bracket 66A and the first ramp body 44 are pivotable or rotatable in unison about the pivot point 68 of the first bracket 66A. The second bracket 66B can extend outwardly away from the second ramp body 46 to space the second ramp body 46 away from the floor 14 when in the storage position. Furthermore, the second bracket 66B and the second ramp body 46 are pivotable or rotatable in unison about the pivot point 68 of the second bracket 66B.

As best shown in FIG. 1, in certain embodiments, the first and second brackets 66A, 66B can each include a first arm 70 and a second arm 72 spaced from each other. Each of the first and second arms 70, 72 of each of the brackets 66A, 66B can include the respective pivot point 68. The first and second arms 70, 72 of the first bracket 66A can be spaced from each other such that the first protrusion 30 is disposed therebetween. For example, the first and second arms 70, 72 of the first bracket 66A can be attached to the first ramp body 44, and more specifically, attached to one of the first segments 36A. Specifically, the first and second arms 70, 72 of the first bracket 66A can be attached to the outer most first segment 36A, and the other first segments 36A are nested inside the outer most first segment 36A. The outer most first segment 36A can also be referred to as the initial segment 38.

Furthermore, the first and second arms 70, 72 of the first bracket 66A can be rotatably secured to the floor 14 and/or the first sidewall 16 by the pivot point 68, and similarly, the first and second arms 70, 72 of the second bracket 66 can be rotatably secured to the floor 14 and/or the second sidewall 18 by the pivot point 68. When utilizing the mounting brackets 50, the pivot point 68 of each of the arms 70, 72 of the first and second brackets 66A, 66B can be rotatably secured to respective mounting brackets 50. As best shown in FIG. 2, the pivot point 68 of each of the arms 70, 72 is cooperating with respective mounting brackets 50.

Referring to FIG. 1, the first and second arms 70, 72 of the second bracket 66B can be spaced from each other such that the second protrusion 32 is disposed therebetween. For example, the first and second arms 70, 72 of the second bracket 66B can be attached to the second ramp body 46, and more specifically, attached to one of the second segments 36B. Specifically, the first and second arms 70, 72 of the second bracket 66B can be attached to the outer most second segment 36B, and the other second segments 36B are nested inside the outer most second segment 36B. The outer most second segment 36B can also be referred to as the initial segment 38.

In certain embodiments, the location of the first and second latching devices 48A, 48B can be changed. As a reminder, FIG. 2 can represent the features/components of both the first and second ramp bodies 44, 46, and surrounding features/components, since the ramp bodies 44, 46 are mirror images of each other. FIG. 2 illustrates two boxes in phantom lines to represent an alternative location of the first or second latching devices 48A, 48B, in which one of the first or second latching devices 48A, 48B secure the first arm 70 of the first or second bracket 66A, 66B upwardly away from the floor 14 such that the first or second ramp body 44, 46 is in the storage position and another one of the first or second latching devices 48A, 48B secure the second arm 72 of the first or second bracket 66A, 66B upwardly away from the floor 14 such that the first or second ramp body 44, 46 is in the storage position.

It is also desirable to be able to adjust the position of the ramp 34 when in the use position. For example, the cross vehicle distance between the wheels of a four-wheeled ATV can be different from the cross vehicle distance between the wheels of a lawn mower, and therefore, it is desirable to be able to adjust the ramp 34 to accommodate different sized cargo. As shown in FIG. 1, the first and second ramp bodies 44, 46 (in solid lines) are spaced from each other at a first distance 74 when in the use position, and the first and second ramp bodies 44, 46 (in phantom lines) are spaced from each other at a second distance 76 when in the use position. In this example, the first distance 74 is greater than the second distance 76. As such, depending on the cargo to be loaded, the first and second ramp bodies 44, 46 can be spaced from each other when in the use position or can abut each other when in the use position. For example, when it is desirable to load/unload certain cargo, the first and second ramp bodies 44, 46 are spaced from each other such that the wheels of the cargo align with the corresponding first and second ramp bodies 44, 46.

Specifically, the bracket 66 can include a first portion 78 and a second portion 80 cooperating with each other. At least one of the first and second portions 78, 80 is movable relative to the other one of the first and second portions 78, 80 to adjust the position of the ramp 34 away from the first and second sidewalls 16, 18 when in the use position. Therefore, the first portion 78 can move relative to the second portion 80 or the second portion 80 can move relative to the first portion 78, and alternatively, both of the first and second portions 78, 80 can be movable relative to each other. The movable portion(s) 78, 80 of the bracket 66 can slide, roll, etc. relative to each other.

The first bracket 66A can include the first portion 78A and the second portion 80A cooperating with each other, and at least one of the first and second portions 78A, 80A is movable relative to the other one of the first and second portions 78A, 80A to adjust the position of the first ramp body 44 away from the first sidewall 16 when in the use position. The second bracket 66B can include the first portion 78B and the second portion 80B cooperating with each other, and at least one of the first and second portions 78B, 80B is movable relative to the other one of the first and second portions 78B, 80B to adjust the position of the second ramp body 46 away from the second sidewall 18 when in the use position. Specifically, each of the first and second arms 70, 72 of respective first and second brackets 66A, 66B can include one first portion 78A, 78B and one second portion 80A, 80B, respectively.

As discussed above, the bracket 66 can be adjustable to correspondingly move the ramp 34 for different sized cargo. The bracket 66 can also include a locking feature 82, referred to herein as a second locking feature 82, to secure the first and second portions 78, 80 in the desired position relative to each other, which accordingly secures the ramp 34 in the desired position relative to the first and second sidewalls 16, 18 when in the use position. Said differently, the second locking feature 82 secures the first and second ramp bodies 44, 46 in the desired distance away from each other.

One or more second locking features 82 can be utilized to secure the first and second portions 78A, 80A of the first bracket 66A relative to each other, and similarly, one or more second locking features 82 can be utilized to secure the first and second portions 78B, 80B of the second bracket 66B relative to each other. Each of the first and second arms 70, 72 of the first and second brackets 66A, 66B can include one first portion 78A, 78B and one second portion 80A, 80B. Therefore, one or more of the first and second arms 70, 72 can include one or more second locking features 82. In FIG. 1, for illustrative purposes only, four second locking features 82 are illustrated (one associated with each corresponding first and second arms 70, 72).

It is to be appreciated that more or less second locking features 82 than illustrated can be utilized. For example, one second locking feature 82 can be utilized with one of the first and second arms 70, 72 of the first bracket 66A, and another second locking feature 82 can be utilized with one of the first and second arms 70, 72 of the second bracket 66B. Furthermore, the second locking features 82 can be in a location different than illustrated. For example, the second locking features 82 of the first arms 70 can be disposed on an opposing side than illustrated in FIG. 1, and/or the second locking features 82 of the second arms 72 can be disposed on an opposing side than illustrated in FIG. 1.

The second locking features 82 are shown schematically in the Figures for illustrative purposes only because the second locking features 82 can be any suitable configuration. Non-limiting examples of the second locking feature(s) 82 can include one or more of a pin, a spring pin, a clip, a spring clip, a fastener, a turn knob, a latch, a spring latch, a clamp, a wedge, a stop lock, a component that creates a frictional engagement, etc., or combinations thereof. In certain embodiments, one or more holes can be defined by the first and second portions 78A, 78B, 80A, 80B of the first and/or second brackets 66A, 66B, in which a pin, a clip, a fastener, etc., extends through one of the holes of the first and second portions 78A, 78B, 80A, 80B to secure the respective first and second portions 78A, 78B, 80A, 80B relative to each other. Having a plurality of holes, etc., disposed in a row in at least one of the first and second portions 78, 80 allows the bracket 66 to adjust to different distances away from the sidewalls 16, 18. Therefore, the first portion 78 can define the row of holes and/or the second portion 80 can define the row of holes.

Optionally, the floor 14 can include one or more ribs 84 (best shown in FIG. 2). When utilizing the ribs 84, one of the ribs 84 can be disposed under one or more of the pivot points 68, and/or, the ribs 84 can be spaced from the pivot points 68 such that no rib 84 is disposed under the pivot points 68. FIG. 2 illustrates one rib 84 under one pivot point 68 and no rib 84 disposed under another pivot point 68.

While the best modes and other embodiments for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A loading ramp assembly configured for attachment in a cargo area including a floor, a first sidewall disposed transverse to the floor and a second sidewall disposed transverse to the floor, with the first and second sidewalls spaced apart and generally aligning with each other, the loading ramp assembly comprising:
a ramp pivotable inside the cargo area relative to the floor between a use position in which at least a portion of the ramp is disposed in a generally horizontal orientation on top of the floor and a storage position in which the ramp is spaced from the floor and secured in a generally vertical orientation along at least one of the first and second sidewalls;
further including a bracket attached to the ramp;
wherein:
the ramp includes a ramp body;
the bracket includes a first arm and a second arm spaced apart from each other, and the first and second arms are attached to the ramp body;
the first and second arms of the bracket each include a respective pivot point to pivot the ramp body between the storage position and the use position;
the ramp includes a plurality of segments cooperating with each other;
one of the segments is defined as an initial segment that extends between the first and second arms and overlaps the floor between the first and second arms;
the initial segment includes a use surface and a mounting surface opposing each other;
the use surface of the initial segment faces outwardly opposite of the floor when in the use position and the mounting surface of the initial segment faces the floor when in the use position;
the first and second arms are mounted to the mounting surface of the initial segment, and at least part of the first and second arms are disposed between the mounting surface and the floor when the ramp is in the use position; and
at least another one of the segments is movable between a loading position and a stowed position, and the at least another one of the segments is configured to telescope outwardly from the initial segment such that at least a portion of the ramp is disposed outside of the cargo area when in the loading position, and the at least another one of the segments is configured to retract inwardly into the initial segment when in the stowed position such that the ramp is completely contained inside the cargo area when in the stowed position.

2. The assembly as set forth in claim 1 wherein the bracket extends outwardly away from the ramp to space the ramp away from the floor when in the storage position, and wherein the bracket and the ramp are pivotable in unison about the pivot point of the arms between the use and storage positions.

3. The assembly as set forth in claim 2 wherein each of the first and second arms include a first portion and a second portion cooperating with each other, and at least one of the first and second portions is movable relative to the other one of the first and second portions to adjust the position of the ramp away from the first and second sidewalls when in the use position.

4. The assembly as set forth in claim 2 wherein the floor and one of the first and second sidewalls cooperate to present a protrusion disposed inside the cargo area which defines a backside of a wheel well, and wherein the initial segment is elongated between the first and second arms such that the initial segment overlaps the protrusion, and wherein the bracket is configured to position the ramp away from the protrusion when the ramp pivots between the use and storage positions without interference from the protrusion.

5. The assembly as set forth in claim 1 wherein at least one of the segments includes a stop feature configured to prevent at least one of the segments from retracting to the stowed position when the segments are in the loading position.

6. The assembly as set forth in claim 5 wherein at least one of the segments defines a slot and at least another one of the segments include a projection disposed in the slot, and wherein the stop feature is further defined as a recess disposed adjacent to the slot and extending outwardly away from the slot in a different direction from the slot which allows the projection to move between the slot and the recess when one of the segments is pivoted at an angle relative to another one of the segments.

7. The assembly as set forth in claim 1 further including a latching device supported by at least one of the first and second sidewalls and configured to secure the ramp in the storage position and release the ramp to allow rotation of the ramp to the use position.

8. The assembly as set forth in claim 7 wherein the latching device engages the ramp when in the storage position.

9. The assembly as set forth in claim 1 wherein the ramp body is further defined as a first ramp body, and wherein the ramp includes second ramp body spaced from the first ramp body and each of the ramp bodies are pivotable between the use and storage positions in opposite directions from each other, with the first ramp body secured relative to the first sidewall when in the storage position and the second ramp body secured relative to the second sidewall when in the storage position.

10. The assembly as set forth in claim 9 wherein the plurality of segments include a plurality of first segments for the first ramp body, and wherein one of the first segments is defined as the initial segment, and wherein at least one of the other first segments is movable between the loading position and the stowed position, and wherein the at least one of the other first segments is configured to telescope outwardly relative to the initial segment of one of the first segments such that at least a portion of the first ramp body is disposed outside of the cargo area when in the loading position, and wherein the at least one of the other first segments is configured to retract inwardly relative to the initial segment of one of the first segments such that the first ramp body is completely contained inside the cargo area when in the stowed position.

11. The assembly as set forth in claim 10 wherein the bracket includes a first bracket attached to the first ramp body, and wherein each of the first and second arms include a first portion and a second portion cooperating with each other, and at least one of the first and second portions is movable relative to the other one of the first and second portions to adjust the position of the first ramp body away from the first sidewall when in the use position.

12. The assembly as set forth in claim 10 wherein at least one of the first segments includes a stop feature configured to prevent at least one of the first segments from retracting to the stowed position when the first segments are in the loading position.

13. The assembly as set forth in claim 9 wherein the ramp body is further defined as a first ramp body and the ramp includes a second ramp body, and wherein the plurality of segments include a plurality of first segments for the first ramp body and a plurality of second segments for the second ramp body, and wherein one of the first segments is defined as the initial segment, and one of the second segments includes an initial segment, and wherein at least one of the other second segments is movable between a loading position and a stowed position, and wherein the at least one of the other second segments is configured to telescope outwardly relative to the initial segment of one of the second segments such that at least a portion of the second ramp body is disposed outside of the cargo area when in the loading position, and wherein the at least one of the other second segments is configured to retract inwardly relative to the initial segment of one of the second segments such that the second ramp body is completely contained inside the cargo area when in the stowed position.

14. The assembly as set forth in claim 13 wherein the bracket includes a first bracket attached to the first ramp body, and the bracket includes a second bracket attached to the second ramp body, and wherein the first bracket includes the first and second arms, and wherein the second bracket includes a first arm and a second arm spaced apart from each other, and the first and second arms of the second bracket are attached to the second ramp body, and wherein each of the first and second arms of the second bracket include a first portion and a second portion cooperating with each other, and at least one of the first and second portions is movable relative to the other one of the first and second portions to adjust the position of the second ramp body away from the second sidewall when in the use position.

15. The assembly as set forth in claim 13 wherein at least one of the second segments includes a stop feature configured to prevent at least one of the second segments from retracting to the stowed position when the second segments are in the loading position.

16. The assembly as set forth in claim 9 further including a first latching device supported by the first sidewall and configured to secure the first ramp body in the storage position and release the first ramp body relative to the first sidewall which allows rotation of the first ramp body to the use position, and further including a second latching device supported by the second sidewall and configured to secure the second ramp body in the storage position and release the second ramp body relative to the second sidewall which allows rotation of the second ramp body to the use position.

17. The assembly as set forth in claim 9 wherein:
the first sidewall extends away from the floor to a distal edge spaced from the floor and the second sidewall extends away from the floor to a distal edge spaced from the floor;
the floor and the first sidewall cooperates to present a first protrusion disposed inside the cargo area which defines a backside of a first wheel well;
the floor and the second sidewall cooperates to present a second protrusion disposed inside the cargo area which defines a backside of a second wheel well, with the first and second wheel wells spaced apart and generally aligning with each other;
the first ramp body is disposed between the distal edge of the first sidewall and the first protrusion when in the storage position; and
the second ramp body is disposed between the distal edge of the second sidewall and the second protrusion when in the storage position.

18. A movable cargo transport comprising:
a cargo area including a floor, a first sidewall disposed transverse to the floor and a second sidewall disposed transverse to the floor, with the first and second sidewalls spaced apart and generally aligning with each other;
a ramp including a first ramp body and a second ramp body that are pivotable inside the cargo area between a use position and a storage position;
wherein the first ramp body is pivotable to the use position in which at least a portion of the first ramp body is disposed in a generally horizontal orientation on top of the floor and the storage position in which the first ramp body is secured in a generally vertical orientation along the first sidewall such that the first ramp body is completely disposed inside the cargo area;
wherein the second ramp body is pivotable to the use position in which at least a portion of the second ramp body is disposed in a generally horizontal orientation on top of the floor and the storage position in which the second ramp body is secured in a generally vertical orientation along the second sidewall such that the second ramp body is completely disposed inside the cargo area;
a first bracket including a first arm and a second arm spaced apart from each other, and the first and second arms are attached to the first ramp body;
wherein:
the floor and the first sidewall cooperates to present a first protrusion disposed inside the cargo area which defines a backside of a first wheel well;
the first protrusion is disposed between the first and second arms of the first bracket, and the first ramp body extends between the first and second arms and overlaps the first protrusion when the first ramp body is in the storage position;

the first and second arms of the first bracket include a respective pivot point to pivot the first ramp body between the storage position and the use position;

the ramp includes a plurality of segments cooperating with each other, and wherein one of the segments is defined as an initial segment that overlaps the floor between the first and second arms and includes a use surface that faces outwardly opposite of the floor when in the use position, and the use surface of the initial segment faces the first sidewall when in the storage position; and at least another one of the segments is movable between a loading position and a stowed position, and wherein the at least another one of the segments is configured to telescope outwardly relative to the initial segment such that at least a portion of the ramp is disposed outside of the cargo area when in the loading position, and wherein the at least another one of the segments is configured to retract inwardly relative to the initial segment such that the ramp is completely contained inside the cargo area when in the stowed position.

19. The movable cargo transport as set forth in claim 18 further including a plurality of mounting brackets spaced from each other and each secured to the first sidewall, with one of the mounting brackets secured to the first arm of the first bracket, and another one of the mounting brackets secured to the second arm of the first bracket, and wherein the mounting brackets support the first ramp body.

20. The movable cargo transport as set forth in claim 19 further including a latching device attached to one of the mounting brackets, and wherein the latching device is configured to secure the ramp in the storage position and release the ramp to allow the ramp to pivot to the use position.

* * * * *